United States Patent
Biarnes et al.

(10) Patent No.: US 8,581,909 B2
(45) Date of Patent: Nov. 12, 2013

(54) METHOD FOR DETERMINING THE CHARACTERISTIC POINTS OF A BRIDGE ON AN AIRPORT MAP

(75) Inventors: Caroline Biarnes, Toulouse (FR); Erick Rakotoarisoa, Tournefeuille (FR); Pierre Gamet, Blagnac (FR)

(73) Assignee: Thales, Neuilly Sur Seine (FR)

( * ) Notice: Subject to any disclaimer, the term of this patent is extended or adjusted under 35 U.S.C. 154(b) by 830 days.

(21) Appl. No.: 12/753,369

(22) Filed: Apr. 2, 2010

(65) Prior Publication Data

US 2010/0253687 A1 Oct. 7, 2010

(30) Foreign Application Priority Data

Apr. 3, 2009 (FR) ..................................... 09 01642

(51) Int. Cl.
*G06T 11/20* (2006.01)

(52) U.S. Cl.
USPC ........................................................ 345/441

(58) Field of Classification Search
None
See application file for complete search history.

(56) References Cited

U.S. PATENT DOCUMENTS

| | | | |
|---|---|---|---|
| 6,597,354 B2 * | 7/2003 | Sakamoto et al. ............ 345/419 |
| 2003/0117405 A1 * | 6/2003 | Hubrecht et al. ............ 345/543 |
| 2008/0140727 A1 * | 6/2008 | Pschierer ...................... 707/200 |
| 2008/0154493 A1 | 6/2008 | Bitar et al. |
| 2008/0207191 A1 * | 8/2008 | Fleenor et al. ............ 455/422.1 |
| 2009/0073177 A1 * | 3/2009 | Jiao et al. .................... 345/501 |
| 2009/0125236 A1 | 5/2009 | Fontaine et al. |
| 2009/0150790 A1 * | 6/2009 | Wilhelm ...................... 715/737 |

FOREIGN PATENT DOCUMENTS

WO 2009-027498 A1 3/2009

\* cited by examiner

*Primary Examiner* — Ke Xiao
*Assistant Examiner* — Kyle Zhai
(74) *Attorney, Agent, or Firm* — Baker & Hostetler LLP

(57) ABSTRACT

The invention is an automatic method making it possible to determine the characteristic points of a bridge as well as their correct ordering on the basis of an airport database, with a view to allowing the correct graphical representation of the said bridge on a digitized airport map. One of the main advantages of the invention resides in its automatic character.

11 Claims, 3 Drawing Sheets

METHOD FOR DETERMINING THE CHARACTERISTIC POINTS OF A BRIDGE ON AN AIRPORT MAP

CROSS-REFERENCE TO RELATED APPLICATIONS

This application claims priority to foreign French patent application No. FR 09 01642, filed on Apr. 3, 2009, the disclosure of which is hereby incorporated by reference in its entirety.

FIELD OF THE INVENTION

The present invention relates to the processing of airport databases within the framework of the ARINC816 standard with a view to making airport maps. More precisely, the invention consists of a method allowing the determination and the ordering of the characteristic points of bridges on airport maps.

BACKGROUND OF THE INVENTION

The general context is that of the application of the ARINC816 standard which imposes a specific format for airport map databases. These airport databases, once compiled in the form of digitized maps, allow aircraft pilots to position themselves on the said digitized airport maps during the takeoff, landing or taxiing phases. Airport databases are produced by specialist companies, called data providers, and must be regularly updated, typically every 28 days.

More precisely, the relevance is to particular elements of these airport databases conforming to the ARINC816 standard: the elements corresponding to taxiways or linkways, more commonly called "taxiway elements", the term that will be used subsequently. These taxiways are defined as sets of polygons, corresponding to roadways on which the aircraft can taxi and which are not takeoff or landing runways. Each polygon possesses an identity, corresponding to an identifier. The ARINC816 standard specifies that it must be possible to symbolize bridges in a specific and visible manner. Indeed, bridges are crucial elements of airport maps, from the safety point of view. To chart these bridges, the ARINC816 standard stipulates that data providers must indicate where the bridges are situated and whether they are above or below another pathway. Data providers, constrained moreover by the precise detail of the data that they supply, generally give a set of points to characterize a bridge. Such sets of points can constitute complex polygons.

The problem posed is to determine the four characteristic points of a bridge, corresponding substantially to the four corners of the said bridge, on the basis of a complex polygon, and to order them so as to allow correct orientation of the bridge on the corresponding airport map. The objective is to determine, on the basis of the set of points provided, two pairs of characteristic points, each pair of points constituting substantially one side of the bridge.

Currently, to characterize a bridge, data providers therefore provide a set of points that can constitute a complex polygon. The problem is to determine two pairs of correctly ordered points, so as to be able to represent the said bridge correctly on an airport map. No automatic method currently enables this task to be accomplished: this is the subject of the present invention.

SUMMARY OF THE INVENTION

For this purpose, the subject of the invention is a method for determining and ordering the characteristic points of a bridge on an airport map, the said airport map comprising:

a set of polygons characterizing elements of linkway type, each polygon exhibiting an identifier, and each polygon being defined by a set of points, each point common to two polygons having a single mathematical representation, a bridge defined by a set of at least four points, comprising the following steps:

the determination of a set of neighbouring polygons adjoining the said bridge from among the set of polygons, for each point of the bridge, the verification of its possible equality with a point of one of the neighbouring polygons, consequently called adjacent polygon, so as to construct a set of 2 to N common points, N being greater than or equal to 4, the recording, for each common point, of the identity of the polygon or polygons to which it belongs, the determination of four characteristic points of the bridge, notably from among the common points found in step 2, the determination of the two pairs of characteristic points, corresponding to a step of ordering the said characteristic points, the said pairs constituting segments approximately parallel to the direction of travel over the bridge.

According to the invention, the set of neighbouring polygons corresponds to the set of polygons whose barycentre is situated at a distance from the bridge which is less than a predefined threshold.

The predefined threshold can equal 300 meters.

Advantageously, when the search for the common points in step 2 of the method culminates in the determination of a set of four common points, corresponding to the said four characteristic points, of which two belong to a first adjacent polygon and two belong to a second adjacent polygon, step 5 of the method, corresponding to the ordering and to the determination of the two pairs of characteristic points, consists of:

the definition of two potential pairs comprising, for the first, a first point of the first adjacent polygon and a first point of the second adjacent polygon and, for the second, a second point of the first adjacent polygon and a second point of the second adjacent polygon, the search for an intersection between the segments defined by the two potential pairs:

if no intersection exists, the potential pairs constitute the pairs of characteristic points of the bridge, if an intersection exists, the pairs of characteristic points of the bridge consist, for one, of the first point of the first adjacent polygon and of the second point of the second adjacent polygon, and, for the other, of the second point of the first adjacent polygon and of the first point of the second adjacent polygon.

Advantageously, for the determination of the four characteristic points in step 4 of the method, the common points determined in step 2 of the method and belonging, in addition to the bridge, to at least two adjacent polygons, are eliminated and cannot constitute characteristic points of the bridge.

Advantageously, if step 2 of the method, for determining a set of common points, culminates only in the determination of two common points, the said two common points constituting two characteristic points of the bridge and belonging to one and the same adjacent polygon, the said method comprises means for determining the other two characteristic points of the bridge by way of mathematical processing procedures.

BRIEF DESCRIPTION OF THE DRAWINGS

Other characteristics and advantages of the invention will become apparent with the aid of the description which follows given in regard to the appended drawings which represent.

DETAILED DESCRIPTION

Figure 1:
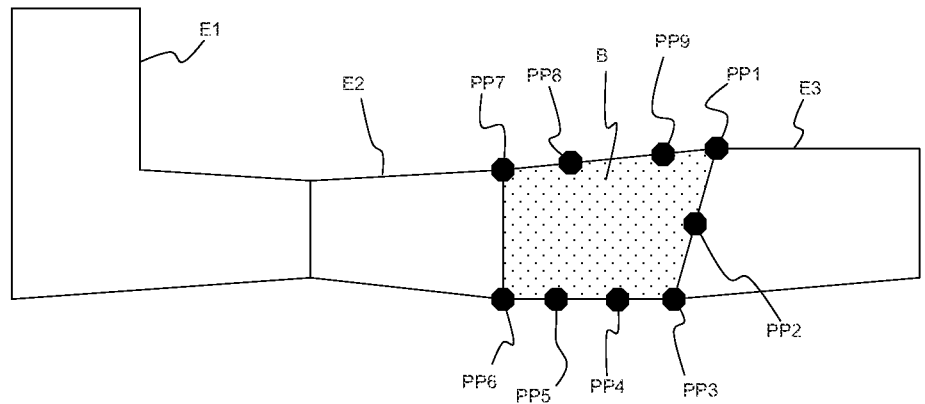
FIG. 1: the diagram of an example of raw data of an airport database, comprising a bridge.

FIG. 1 is a diagram representing a fraction of taxiway of an airport. The elements corresponding, in an airport database, are taxiway elements, as described above. The taxiway elements consist of a set of polygons E1, E2, E3. A bridge B is a particular taxiway element, consisting of a single polygon. Within the framework of the implementation of the ARINC816 standard, and as was previously pointed out, data providers indicate the situation of the bridges, such as the bridge B, characterized by a set of points PP1, PP2, PP3; PP4, PP5, PP6, PP7, PP8, PP9 constituting a complex polygon.

The invention consists in determining, from among this set of points provided, the four characteristic points of the bridge B, and in ordering them so as to allow correct representation of the said bridge B on a digitized airport map.

Figure 2A:
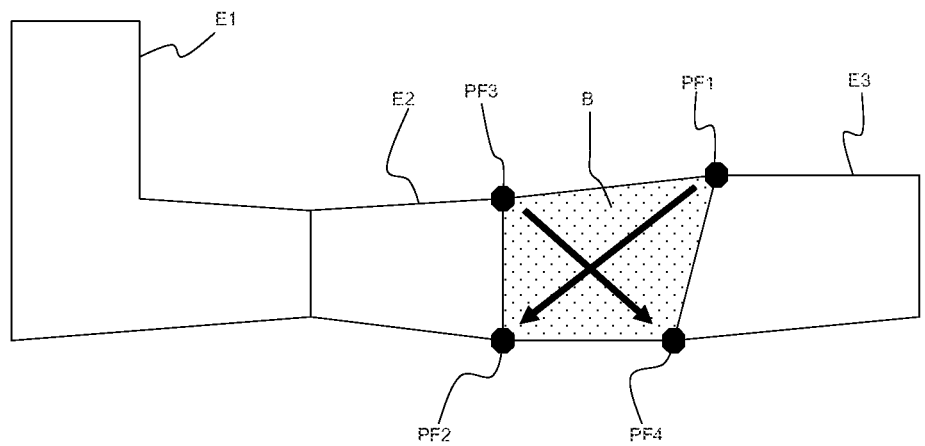
FIG. 2a: a diagram representing the determination of two wrongly ordered pairs of characteristic points of a bridge.

FIG. 2a illustrates first of all the procedure for determining the four characteristic points of the bridge B, according to the invention. In a first phase, the polygons adjacent E2, E3 or potentially adjacent E1 to the bridge B are identified. For this purpose, it is possible to chart the polygons belonging to the same taxiway element: that is to say those which bear the same name. Those whose barycentre is close to the polygon corresponding to the bridge B are thereafter extracted. Barycentres situated at a distance of less than a predefined threshold from the said bridge B are considered to be close to the bridge B. This predefined threshold can be for example fixed at 300 meters. In the example of FIG. 2, the two adjacent polygons E2 and E3 are thus determined.

Subsequently, each point of the bridge B, corresponding to the points PP1 to PP9 of FIG. 1, is analysed to ascertain whether it is equal to a point belonging to one of the adjacent polygons E2, E3 that were found in the previous step. It should be noted here that the data provided in the airport databases within the framework of the implementation of the ARINC816 standard are such that two equal points are necessarily identified as one and the same point. It is not possible to have two points that are geographically identical but different from a mathematical point of view.

In this way, the figure shows that the points PF1, PF2, PF3, PF4 are determined as the four characteristic points of the bridge B.

But FIG. 2a also shows that if the four characteristic points PF1 to PF4 are not correctly ordered, then automatic and correct representation of the bridge B on a digitized map cannot be guaranteed. Indeed, if pairs of characteristic points are determined in an arbitrary manner, for example here PF1 with PF2 and PF3 with PF4, an incorrect representation of the bridge is obtained. The same goes if one pair PF1-PF4 and another PF2-PF3 are determined.

The present invention makes it possible to guarantee the possibility of determining the two correct pairs of characteristic points, making it possible to represent bridges B in an appropriate manner on an airport map.

Figure 2B:
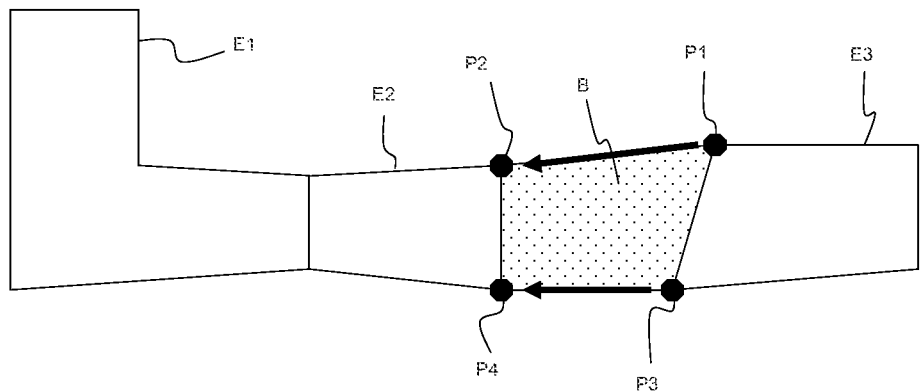
FIG. 2b: a diagram representing the determination of two correctly ordered pairs of characteristic points of a bridge.

FIG. 2b represents a fraction of taxiway elements in which the bridge B is determined by two correctly ordered pairs of characteristic points. To determine the two correct pairs of characteristic points, P1-P2 and P3-P4 in the example of FIG. 2b, the method according to the invention comprises a step of recording, for each point of the bridge B, the identity of the adjacent polygon to which it belongs. Thus, from among the set of points PP1 to PP9 of FIG. 1, the point P1 in FIG. 2b—corresponding to the point PP1 in FIG. 1—is identified as characteristic of the bridge B, in accordance with the first phase described in FIG. 2a; during the same step, it is recorded that this point P1 characteristic of the bridge B belongs furthermore to the polygon E3. In the same manner, it is recorded that the point P2, characteristic of the bridge B, belongs to the polygon E2, that the point P3, characteristic of the bridge B, belongs to the polygon E3, and that the point P4, characteristic of the bridge B, belongs to the polygon E2.

At the risk of representing a bridge B whose direction of travel would be orthogonal to the direction of travel on the neighbouring taxiway element, it is known that a pair of characteristic points may not belong to one and the same adjacent polygon. It is therefore deduced from this that P1 and P3 on the one hand, and P2 and P4 on the other hand, belong to different pairs. Henceforth, there exist only two possible combinations:

P1 and P4 form one characteristic pair and P2 and P3 form the other characteristic pair;

or:

P1 and P2 form one characteristic pair and P3 and P4 form the other characteristic pair.

An arbitrary provisional choice is then made; for example P1 forms a pair with P4 and P2 forms a pair with P3. A geometric analysis is then performed to detect an intersection, if any, between the segments corresponding to the arbitrarily formed pairs. If there is no intersection, the choice was right and the correct ordering of the characteristic points has therefore been found. If there is an intersection between the segments, the pairs of characteristic points of the bridge B are those of the second combination. In the example of FIG. 2b, by virtue of the method according to the invention the following two pairs of characteristic points are determined: P1 with P2 and P3 with P4. In this way, it is possible to represent the bridge B correctly on an airport map, in a totally automated manner.

Figure 3:
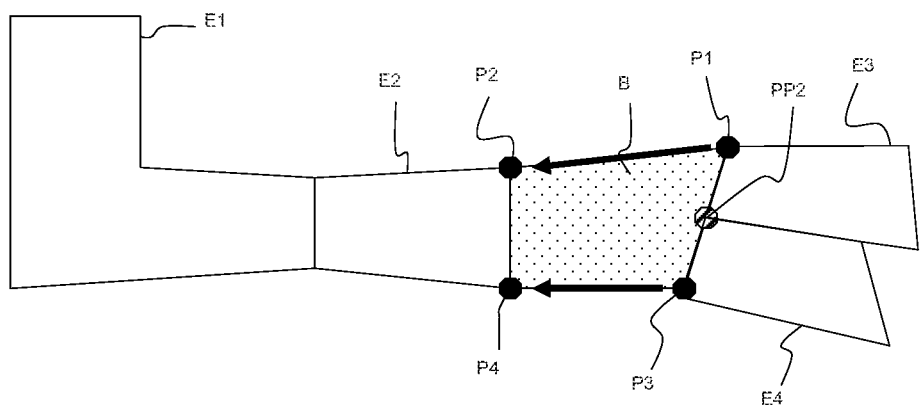
FIG. 3: the diagram of an exemplary airport map on which a bridge comprises two adjacent polygons on the same side.
Figure 4:
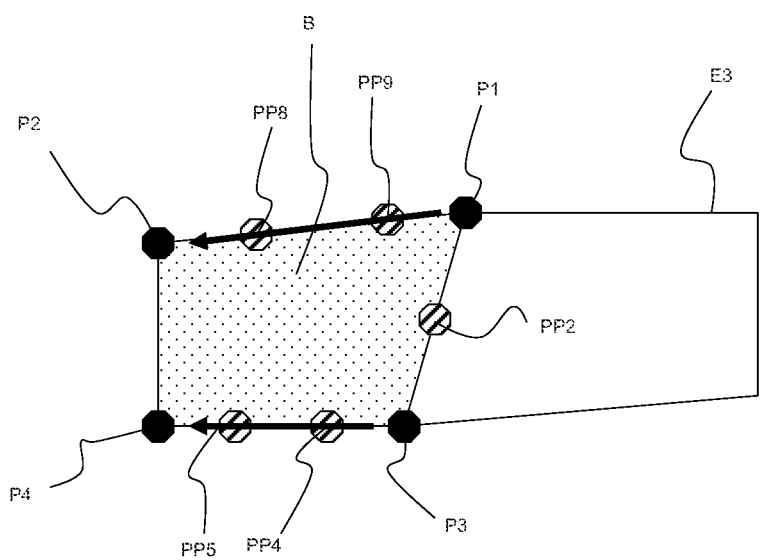
FIG. 4: the diagram of an exemplary airport map on which a bridge exhibits a side not comprising any adjacent polygon.

FIGS. 3 and 4 present particular cases that the invention also makes it possible to treat. In the case of FIG. 3, the bridge B exhibits two adjacent polygons on the same side, here on its right. The point PP2, belonging to the set of points provided to characterize the bridge B, can constitute an ambiguity since it belongs to the bridge B and to a polygon E3; nevertheless, it does not constitute a characteristic point of the bridge B, the points P1, P2, P3, P4 being better placed. In this case, a preferred mode of implementation of the method according to the invention makes it possible to eliminate the point PP2 since it belongs, in addition to the bridge B, to two distinct polygons E3 and E4. According to the invention, for this reason this point PP2 is considered as not characteristic of the bridge B.

FIG. 4 presents the case where, on one side of the bridge B, here on its left, no adjacent polygon exists or has been detected. In this case, by following the steps, described in FIG. 2a, of the method according to the invention, only two characteristic points P1 and P3 are detected. But in accordance with the detail afforded in FIG. 2b, the fact is recorded that the points P1 and P3 belong to the same polygon E3 and that they therefore cannot constitute a pair of characteristic points of the bridge B. According to a particular implementation of the method according to the invention, the other two characteristic points P2 and P4 are then determined, from among the potential points PP4, PP5, P4, P2, PP8 and PP9, by mathematical processing procedures as being the points furthest, respectively from P3 and from P1, among the potential points. Thereafter, the pairs of characteristic points P1-P2 and P3-P4 are readily reconstructed by following the method step described in FIG. 2b.

To summarize, the invention is an automatic method making it possible to determine the characteristic points of a bridge as well as their correct ordering on the basis of an airport database, with a view to allowing correct graphical representation of the said bridge on a digitized airport map.

One of the main advantages of the invention resides in its automatic character.

The invention claimed is:

1. A method for determining and ordering the characteristic points of a bridge on an airport map comprising a set of polygons characterizing elements of linkway type, each polygon exhibiting an identifier, and each polygon being defined by a set of points, each point common to two polygons having a single mathematical representation, and a bridge defined by a set of at least four points, the method comprising:
   determining a set of neighbouring polygons adjoining the bridge from among the set of polygons;
   verifying, for each point of the bridge, equality with a point of one of said neighbouring polygons, consequently being an adjacent polygon, to construct a set of 2 to N common points, N being greater than or equal to 4;
   recording, for each common point, the identity of the polygon or polygons to which said each common point belongs,
   determining four characteristic points of the bridge, from among the common points found in the verifying;
   determining the two pairs of characteristic points, corresponding to a step of ordering said characteristic points, said pairs constituting segments parallel to a direction of travel over the bridge.

2. A method according to claim 1, wherein the set of neighbouring polygons corresponds to the set of polygons whose barycentre is situated at a distance from the bridge which is less than a predefined threshold.

3. A method according to claim 2, wherein the predefined threshold equals 300 meters.

4. A method according to claim 2 further comprising the common points in said verifying having culminated in the determination of a set of four common points, corresponding to the four characteristic points, of which two belong to a first adjacent polygon and two belong to a second adjacent polygon, wherein the determining said two pairs of characteristic points comprises:
   defining two potential pairs comprising, for the first pair, a first point of the first adjacent polygon and a first point of the second adjacent polygon and, for the second pair, a second point of the first adjacent polygon and a second point of the second adjacent polygon; and
   searching for an intersection between segments defined by the two potential pairs:
      if no intersection exists, the potential pairs constitute the pairs of characteristic points of the bridge,
      if an intersection exists, the pairs of characteristic points of the bridge comprise, for one pair, of the first point of the first adjacent polygon and of the second point of the second adjacent polygon, and, for the other pair, of the second point of the first adjacent polygon and of the first point of the second adjacent polygon.

5. A method according to claim 2, wherein, for the determining of the four characteristic points, the common points determined in said verifying and belonging, in addition to the bridge, to at least two adjacent polygons, are eliminated and cannot constitute the characteristic points of the bridge.

6. A method according to claim 2, wherein, if said verifying, for determining a set of common points, culminates only in the determination of two common points, the two common points constituting two characteristic points of the bridge and belonging to the same adjacent polygon, the method comprises determining the other two characteristic points of the bridge by way of mathematical processing procedures.

7. A method according to claim 1 further comprising the common points in said verifying having culminated in the determination of a set of four common points, corresponding to the four characteristic points, of which two belong to a first adjacent polygon and two belong to a second adjacent polygon, wherein the determining said two pairs of characteristic points comprises:
   defining two potential pairs comprising, for the first pair, a first point of the first adjacent polygon and a first point of the second adjacent polygon and, for the second pair, a second point of the first adjacent polygon and a second point of the second adjacent polygon; and
   searching for an intersection between segments defined by the two potential pairs:
      if no intersection exists, the potential pairs constitute the pairs of characteristic points of the bridge,
      if an intersection exists, the pairs of characteristic points of the bridge comprise, for one pair, of the first point of the first adjacent polygon and of the second point of the second adjacent polygon, and, for the other pair, of the second point of the first adjacent polygon and of the first point of the second adjacent polygon.

8. A method according to claim 7, wherein, for the determining of the four characteristic points, the common points determined in said verifying and belonging, in addition to the bridge, to at least two adjacent polygons, are eliminated and cannot constitute the characteristic points of the bridge.

9. A method according to claim 7, wherein, if said verifying, for determining a set of common points, culminates only in the determination of two common points, the two common points constituting two characteristic points of the bridge and belonging to the same adjacent polygon, the method comprises determining the other two characteristic points of the bridge by way of mathematical processing procedures.

10. A method according to claim 1, wherein, for the determining of the four characteristic points, the common points determined in said verifying and belonging, in addition to the bridge, to at least two adjacent polygons, are eliminated and cannot constitute the characteristic points of the bridge.

11. A method according to claim 1, wherein, if said verifying, for determining a set of common points, culminates only in the determination of two common points, the two common points constituting two characteristic points of the bridge and belonging to the same adjacent polygon, the method comprises determining the other two characteristic points of the bridge by way of mathematical processing procedures.

* * * * *